US007673230B2

(12) United States Patent
Cote et al.

(10) Patent No.: US 7,673,230 B2
(45) Date of Patent: *Mar. 2, 2010

(54) DISCOVERABILITY AND NAVIGATION OF HYPERLINKS VIA TABS

(75) Inventors: Joseph Paul-Emile Pierre Cote, Issaquah, WA (US); John P. Cordell, Seattle, WA (US); Christopher R. Brown, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1618 days.

This patent is subject to a terminal disclaimer.

(21) Appl. No.: 10/439,879

(22) Filed: May 16, 2003

(65) Prior Publication Data

US 2003/0196174 A1    Oct. 16, 2003

Related U.S. Application Data

(63) Continuation of application No. 08/812,772, filed on Mar. 6, 1997, now Pat. No. 6,785,865.

(51) Int. Cl.
*G06F 17/00* (2006.01)
(52) U.S. Cl. .................. 715/234; 715/205; 715/760
(58) Field of Classification Search .............. 715/205, 715/207, 234, 501.1, 513, 760
See application file for complete search history.

(56) References Cited

U.S. PATENT DOCUMENTS 5,341,293 A   8/1994   Vertelney et al.
5,479,600 A   12/1995  Wroblewski et al.
5,625,781 A   4/1997   Cline et al.
5,664,087 A   9/1997   Tani et al.
5,687,331 A   11/1997  Volk et al.
5,708,764 A   1/1998   Borrel et al.
5,708,825 A   1/1998   Sotomayor
5,708,845 A   1/1998   Wistendahl et al.
5,801,702 A   9/1998   Dolan et al.
5,819,092 A   10/1998  Ferguson et al.
5,845,299 A   12/1998  Arora et al.
5,860,073 A   1/1999   Ferrel et al.
5,870,768 A   2/1999   Hekmatpour
5,890,172 A   3/1999   Borman et al.
5,905,492 A   5/1999   Straub et al.
5,907,850 A   5/1999   Krause et al.
5,940,614 A   8/1999   Allen et al.
5,963,950 A   10/1999  Nielsen et al.

(Continued)

OTHER PUBLICATIONS

Lewis, "Adobe Pagemill 2.0 Handbook", Hayden Books (1996, pp. 62-63, 138-156).*

(Continued)

*Primary Examiner*—Cesar B Paula

(57) ABSTRACT

A user may discover and navigate among hyperlinks through the use of a keyboard. For example, a user may press a tab key to discover and navigate to a first hyperlink that is part of a hypertext document. The first hyperlink is, in response, given focus and a focus shape is drawn around the text or graphics for the hot region of the hyperlink. If the user again presses the tab key, the next hyperlink is given focus and a focus shape (i.e., an outline that surrounds the next hyperlink) is drawn around the next hyperlink. A user may also tab to a placeholder for an image in order to make a decision whether the image should be downloaded or not.

32 Claims, 17 Drawing Sheets

U.S. PATENT DOCUMENTS

| | | | |
|---|---|---|---|
| 5,978,807 | A | 11/1999 | Mano et al. |
| 5,983,244 | A | 11/1999 | Nation |
| 5,987,482 | A | 11/1999 | Bates et al. |
| 6,005,563 | A | 12/1999 | White et al. |
| 6,049,812 | A | 4/2000 | Bertram et al. |
| 6,189,019 | B1 | 2/2001 | Blumer et al. |
| 6,678,706 | B1 * | 1/2004 | Fishel .................... 715/501.1 |

OTHER PUBLICATIONS

"MS Internet Explorer for Windows 95 Version 3.0", *CD ROM excerpt, Microsoft TechNet*, (Jun. 1998),pp. 1-4.

"Internet Explorer 3.0 Comparison Guide", *Cd ROM excerpt, Microsoft TechNet*, (Jun. 1998),pp. 1-13.

Lemay, et al., "Microsoft Frontpage 97", *Sams.net Publishing*, pp. 198-199.

"Microsoft Internet Explorer 3.0", <wysiwyg://54/http://ww4.zdnet.com/pccomp/bestips/browsie5.html>,.

Randall, Neil "Using HTML the Fast and Easy Way to Learn", *Que Corporation*, (1996),.

"Using the Return Key to Advance", *Logical* <http://www.skylink.it/logicalbusiness/t_ret_pr.htm>, (Jun. 12, 1997),.

Vivrette, Robert "Non-Rectangular Windows", *The Unofficial Newsletter of Delphi Users, Issue #17*, (Oct. 1996),.

* cited by examiner

DISCOVERABILITY AND NAVIGATION OF HYPERLINKS VIA TABS

CROSS-REFERENCE TO RELATED APPLICATION

This application is a continuation of application Ser. No. 08/812,772, filed Mar. 6, 1997 now U.S. Pat. No. 6,785,865, priority from the filing date of which is hereby claimed under 35 U.S.C. § 120.

FIELD OF THE INVENTION

The present invention relates generally to data processing systems and, more particularly, to the discoverability and navigation of hyperlinks within a hypertext document using tabs.

BACKGROUND OF THE INVENTION

Usage of the Internet has increased dramatically in the last few years. Most users of the Internet access Web pages that are stored at Web sites. The Web pages are typically hypertext documents that are downloaded from an Internet server to a client computer system. These hypertext documents are encoded in the hypertext markup language (HTML). HTML is a simple markup language that enables the development of hypertext documents that are platform independent.

HTML documents follow a particular syntax. An example document is helpful to illustrate this syntax.

```
<!DOCTYPE HTML PUBLIC "-//IETF//DTD HTML 2.0//EN">
<HTML>
<!-- Here's a good place to put a comment. -->
<HEAD>
<TITLE>Structural Example</TITLE>
</HEAD><BODY>
<H1>First Header</H1>
<P>This is a paragraph in the example HTML file. Keep in mind
that the title does not appear in the document text, but that
the header (defined by H1) does.</P>
<OL>
<L1>First item in an ordered list.
<L1>Second item in an ordered list.
    <UL COMPACT>
    <LI> Note that lists can be nested;
    <LI> Whitespace may be used to assist in reading the
        HTML source.
    </UL>
<LI>Third item in an ordered list.
</OL>
<P>This is an additional paragraph. Technically, end tags are
not required for paragraphs, although they are allowed. You can
include character highlighting in a paragraph. <EM>This sentence
of the paragraph is emphasized.</EM> Note that the &I5;/P>
end tag has been omitted.
<P>
<IMG SRC ="triangle.xbm" alt="Warning: ">
Be sure to read these <b>bold instructions</b>.
</BODY></HTML>
```

As can be seen in the above example, hypertext documents typically contain a number of tags. The tags are delimited by "<" and ">." Tags delimit elements such as headings, paragraphs, lists, character highlighting, and links. Most HTML elements are identified in the document by a start tag, which gives the element name and attributes, followed by the content that, in turn, is followed by an end tag. Start tags are delimited by "<" and ">," whereas end tags are delimited by "</" and ">." An example of a start tag in the above example document is "<H1>" and an example of an end tag is "</H1>." In the above example document, the tags are used to delimit lists, paragraphs, the head of the document, and the body of the document.

One of the elements that may be included in a document written in HTML is a hyperlink or link. A hyperlink enables the user to gain access to another Web site by activating the hyperlink. Each hyperlink includes an anchor and a URL. The anchor specifies the text or other content that will be displayed to a user when the hypertext document is displayed on the user's computer. The anchor may include text or graphics. The URL is a uniform resource locator that specifies the location of the associated Web site or Internet resource. An example of a URL is http://www.msn.com.

When a hypertext document is rendered on a user's computer, the hypertext document may include a number of hyperlinks. A user utilizes the hyperlink by positioning a mouse cursor to point within a hot region associated with the anchor and clicking a mouse button. The Web browser translates this action into a request to gain access to the resource specified by the URL contained within the hyperlink. In the simplest case, the hyperlink appears to the user as text that is differentiated from other text by being highlighted, bold-faced, or distinctly colored. The hyperlink, however, may also appear to the user as a graphical image. The hot region or the hyperlink may encompass the image. In such a case, if the user positions the mouse cursor to point within the hot region and clicks the mouse, the resource associated with the URL contained in the hyperlink will be accessed. In the most complex case, the hyperlink is contained within an image map. An image map is a construct that represents a set of hyperlinks. The image may appear as an image that is segmented into respective hot regions that are associated with respective hyperlinks. Thus, when the user positions the mouse cursor to point inside a given hot region that is part of an image map and clicks the mouse button, the resource identified by the URL for the associated hyperlink is accessed.

One of the difficulties with such hyperlinks is that they are often difficult to discover. Sometimes the visual cues for delineating hyperlinks within a hypertext document are not very effective. This problem is especially acute with image maps where it is difficult to discern the boundaries of the respective hot regions. Typically, a user is able to identify the presence of hyperlinks by moving the mouse cursor throughout the body of the document and noticing when the mouse cursor changes form. In at least one conventional system, the mouse cursor changes from an arrow to a hand when the hot region of a hyperlink is encountered. One limitation of this approach is that a user must navigate the entire document in order to be certain that he/she has located each hyperlink within the document in order to be certain that he/she has located each hyperlink within the document. In addition, a user may not know the extent of the hot region and which hyperlink is associated with a given portion of the screen. Furthermore, users who have difficulty using a mouse, such as handicapped users, cannot readily discern the location of the hot regions for the hyperlinks.

SUMMARY OF THE INVENTION

In accordance with a first aspect of the present invention, a method of navigating among hyperlinks is performed in a computer system having an output device and a document with hyperlinks. In accordance with this method, the document is displayed on the output device and a tab request is received. In response to receiving the tab request, focus is given to a first of the hyperlinks in the document.

In accordance with another aspect of the present invention, a hypertext document is displayed on a video display that is part of a computer system. Hyperlinks within the hypertext document are organized into a sequence. When a user depresses a predefined key on an input device, a next one of the hyperlinks in the sequence is given focus.

In accordance with an additional aspect of the present invention, a method is performed in a computer system such that a visual representation of a hyperlink that is part of a hypertext document is displayed on a video display. Focus is given to the hyperlink and a non-rectangular focus shape is drawn around the visual representation of the hyperlink to indicate that the hyperlink has focus. The focus shape may be, for example, a circle or a non-rectangular polygon.

In accordance with a still further aspect of the present invention, an image map is provided at a client from a server. The image map includes multiple hyperlinks. The image map is displayed on a display device at the client. A user presses a selected key on an input device and, in response, a visual indication of the presence of a hyperlink in the image map is displayed.

In accordance with another aspect of the present invention, a computer system has a server that downloads a hypertext document to a client computer system. The client computer system includes a display device on a keyboard. A method is performed such that a hypertext document is displayed on the display device of the client computer system. At least one image of the document is not immediately downloaded, but a placeholder for the image is displayed. The user uses the keyboard to indicate that the user does not wish for the image to be downloaded. In response, the system determines that the image should not be downloaded, and continues to display the document on the display device. The user may, for example, press a tab key to tab to the placeholder in order to indicate that it does not wish for the image to be downloaded.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein a preferred embodiment of the present invention will be described below relative to the following figures.

DETAILED DESCRIPTION OF THE PREFERRED EMBODIMENT

The preferred embodiment of the present invention provides a systematic approach to discovering and navigating among hot regions of hyperlinks within a hypertext document. A user may discover the hot regions of hyperlinks through the use of the keyboard rather than strictly through the use of a mouse. In the preferred embodiment of the present invention, the user presses the tab button on a keyboard to sequence through hyperlinks that are found within a given hypertext document. The outlines of the associated hot regions are drawn when a user tabs to the hyperlinks. Each hyperlink to which the user tabs gains focus and an associated focus shape is drawn. Focus in this context refers to an area of a window defining scope for processing keyboard input. As will be described in more detail below, the focus shape may be a circle, a rectangle, or a polygon. The preferred embodiment of the present invention thus enables users who cannot use a mouse to discover the presence of hyperlinks within a hypertext document and enables non-handicapped users to systematically identify each of the hyperlinks within a document.

Figure 1:
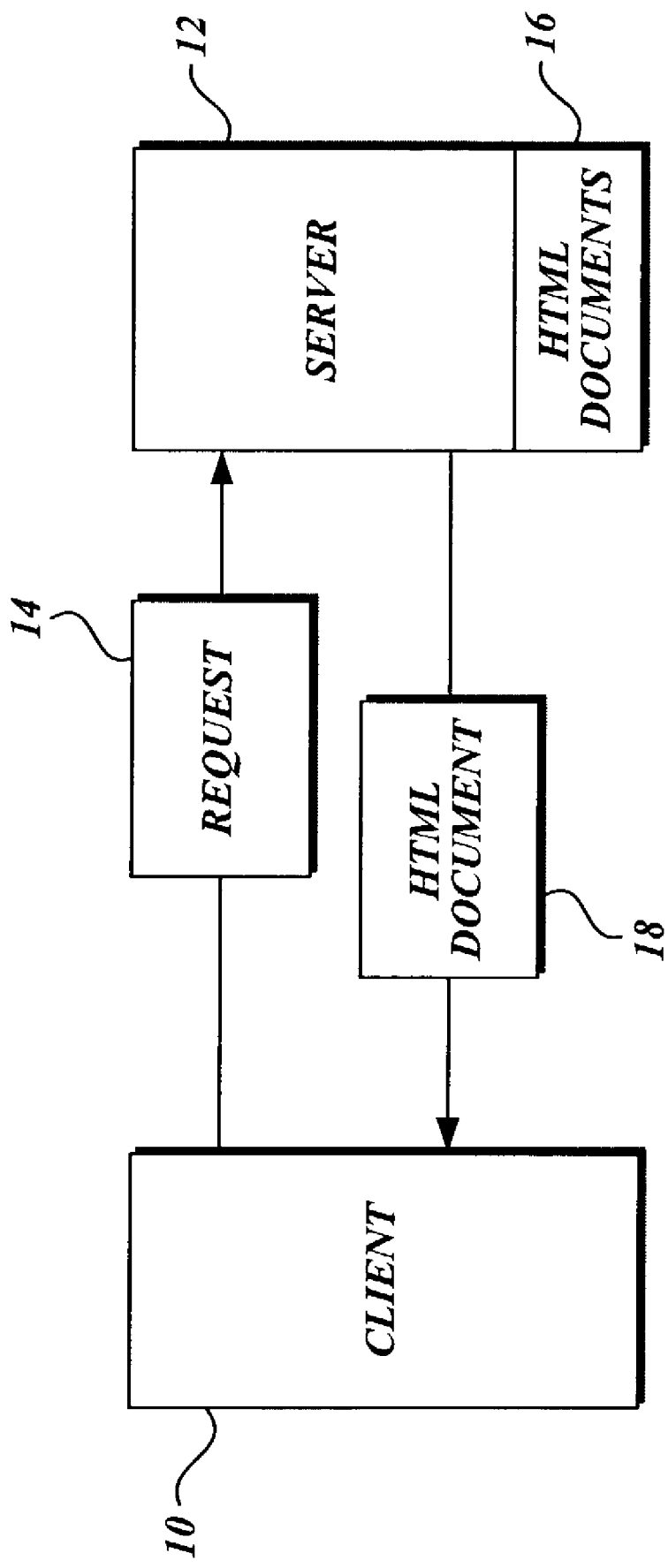
FIG. 1 illustrates a distributed computing environment suitable for practicing the preferred embodiment of the present invention.

FIG. 1 provides a high level view of a distributed computing environment that is suitable for practicing the preferred embodiment of the present invention. A client computer system 10 seeks to access a server computer system 12 that holds HTML document 16. The server 12 may be an Internet server and, in particular, a server for the World Wide Web (Web) portion of the Internet. The client 10 desires to gain access to one of the HTML documents 16. As such the client computer generates a request 14 that is sent to the server 12. The request may be formulated in accordance with the hypertext transfer protocol (HTTP). The server 12 receives the request 14 and sends the requested HTML document 18 to the client 10, which downloads the document.

Figure 2:
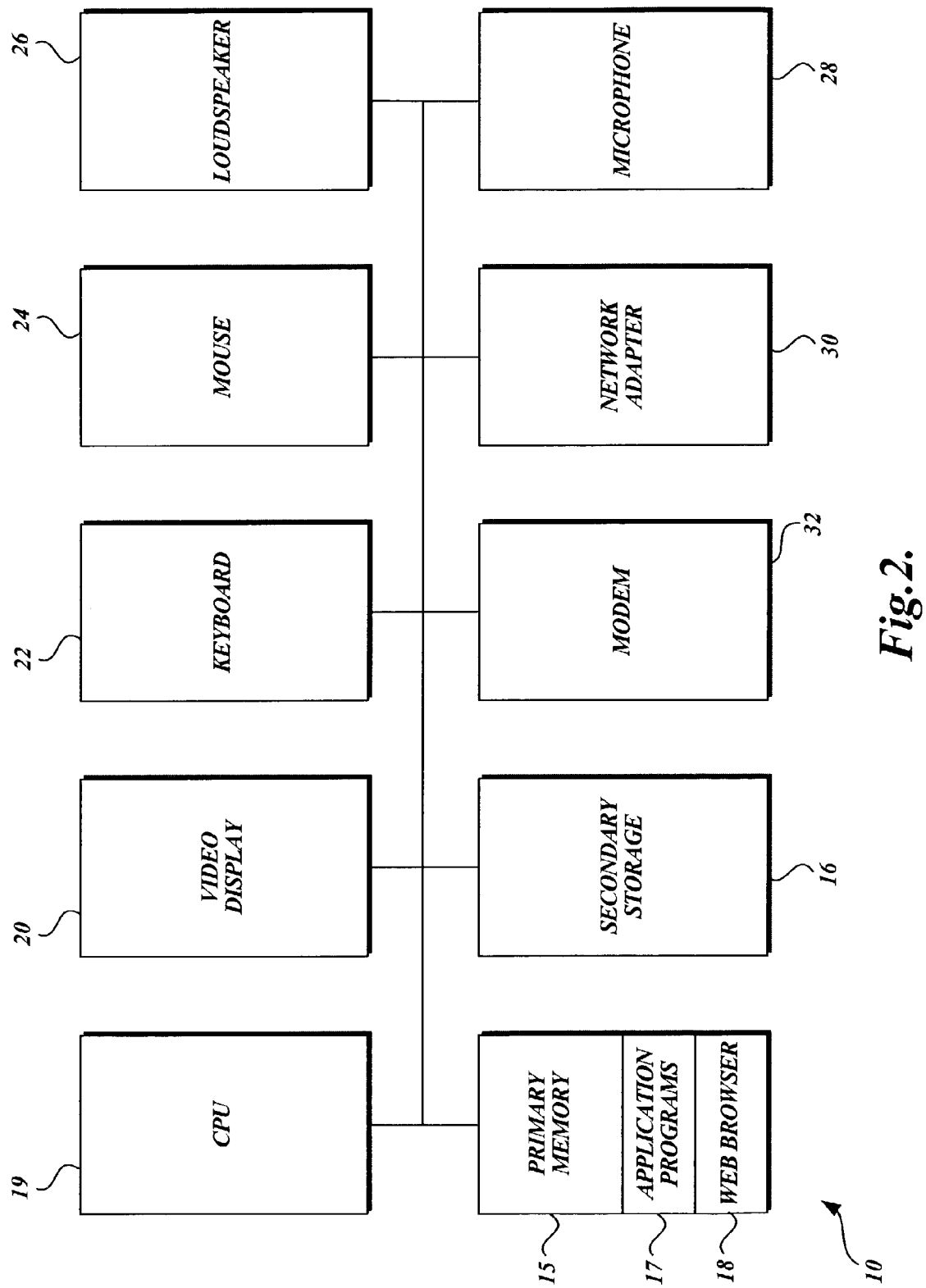
FIG. 2 is a block diagram illustrating components of the client computer system of FIG. 1.

FIG. 2 is a block diagram that illustrates a configuration for the client computer system 10 that is suitable for practicing the preferred embodiment of the present invention. The client computer system 10 includes a central processing unit (CPU) 19 that has access to a primary memory 15 and a secondary storage 16. A Web browser, such as the Microsoft Internet Explorer Web Browser™, is stored within the primary memory 15 and is run on the CPU 19. The primary memory 15 also holds copies of application programs 17 that may display hypertext documents. The client computer system 10 may also include a video display 20, a keyboard 22, a mouse 24, an audio loudspeaker 26, and an input microphone 28. The client computer system 10 may additionally include alternative input devices having keys. The client computer system may have a network adapter 30 for interfacing with a network and a modem 32 for communicating over the telephone line with other computing resources. The modem 32 may be used for the client 10 to communicate with the server 12.

Those skilled in the art will appreciate that the computing environment shown in FIG. 1 and the client computer system configuration shown in FIG. 2 are intended to be merely illustrative and not limiting of the present invention. For example, the client computer system may include multiple processors, additional peripheral devices, fewer peripheral devices, or may alternatively be implemented as a distributed system. Furthermore, the present invention may also be practiced with Intranets and is not limited to the Internet.

Figure 3A:
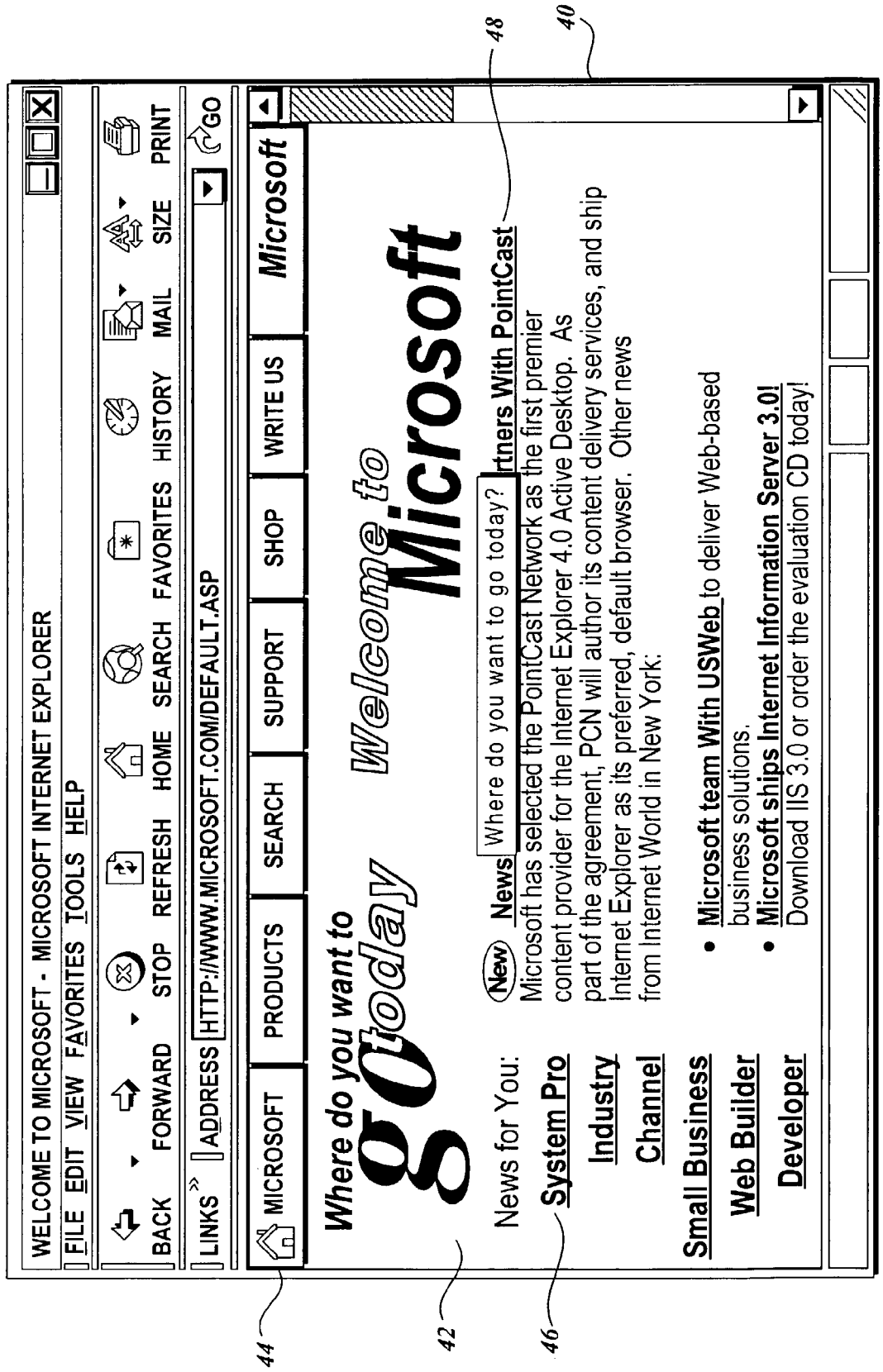
FIGS. 3A-3C show examples of hypertext documents.
Figure 3B:
Figure 3C:
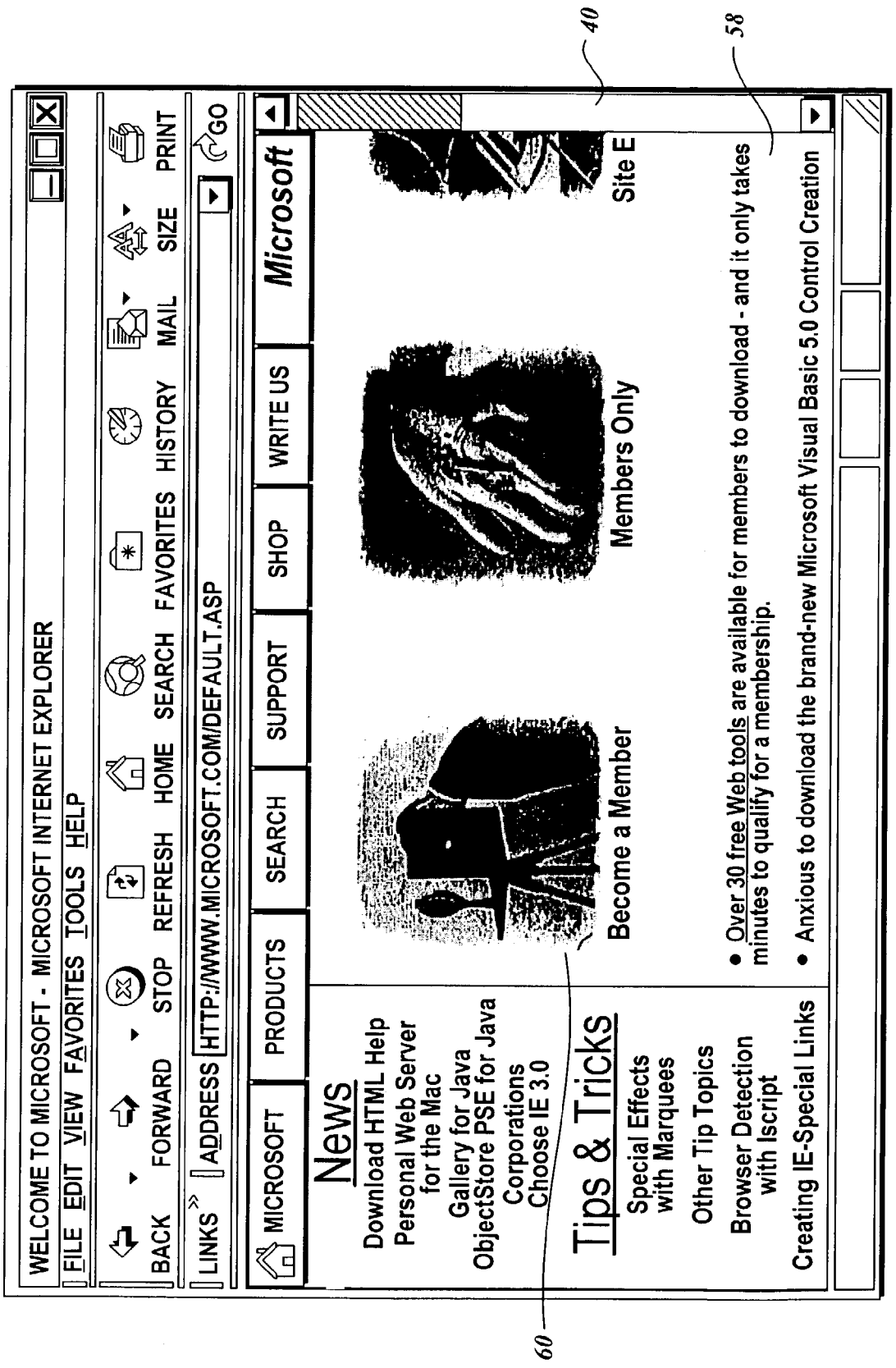

The preferred embodiment of the present invention is able to discover and navigate to hyperlinks that are associated with text, graphical images, or image maps. FIG. 3A shows an example of a hypertext document 42 that is rendered by the Web browser 18 and shown on the video display 20 to a user. The hypertext document 42 includes hyperlinks that are associated with button 44 and text 46 and 48. FIG. 3B shows an example of a hypertext document 50 that is rendered by the Web browser 18 on the video display 20. This hypertext document includes an image map 52. The image map 52 has multiple hyperlinks, such as a hyperlink associated with stove 54 and museum 56, which are depicted as part of the image map. FIG. 3C shows an example of a hypertext document 58 that is rendered on the video display 20 by the Web browser 18. The document 58 includes a hyperlink that is associated with a graphical image 60.

Figure 4:
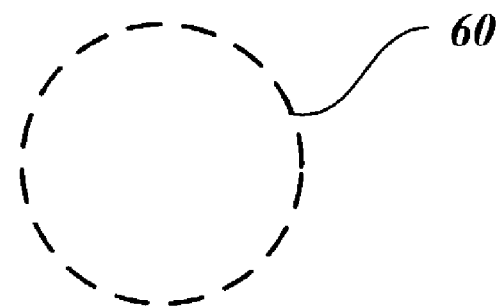
FIG. 4 shows examples of focus shapes that may be used by the preferred embodiment of the present invention.
Figure 4:
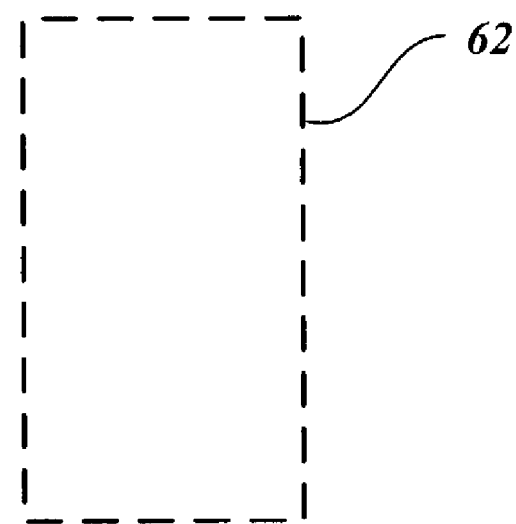
Figure 4:
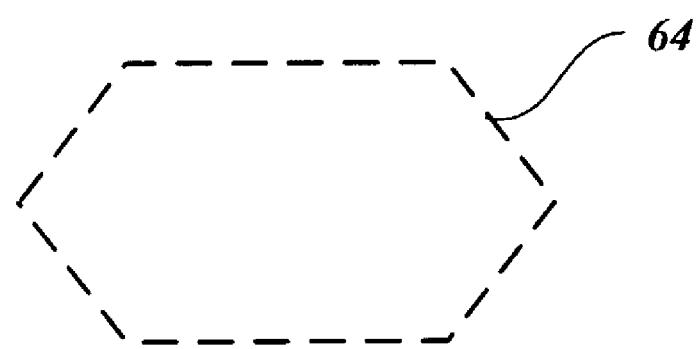

As was mentioned above, the preferred embodiment of the present invention enables a user to tab through each of the hyperlinks in a hypertext document. The preferred embodiment draws a focus shape (bounded by a dotted line) around a hot region of a hyperlink when the hyperlink gains focus. FIG. 4 depicts examples of the different geometries that are available for the focus shapes. A focus circle 60 is displayed around portions of an image map that have associated circular hot regions. A focus rectangle 62 may be displayed around graphical images, text, and portions of image maps that have a rectangular hot region. The focus shape may be a polygon, where the hot region associated with the hyperlink is polygonal (such as an image map). FIG. 4 depicts an illustrative polygonal focus shape 64. It should be appreciated that different polygonal shapes may be drawn and that the shape 64 depicted in FIG. 4 is intended to be merely illustrative. Moreover, the focus shapes may include additional shapes and, in general, constitute closed curves.

Figure 5A:
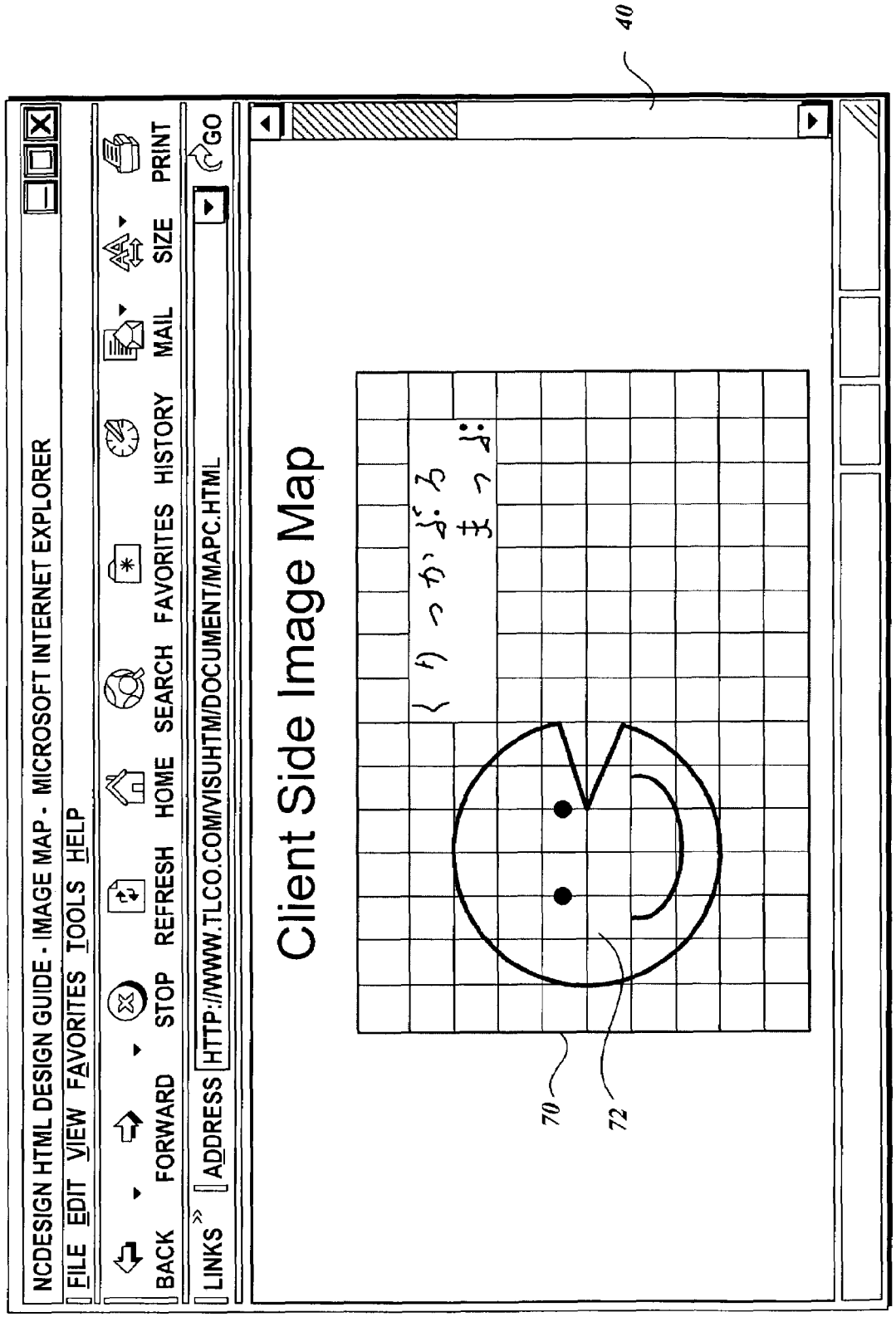
FIGS. 5A-5C show examples of focus shapes drawn on illustrated hypertext documents.
Figure 5B:
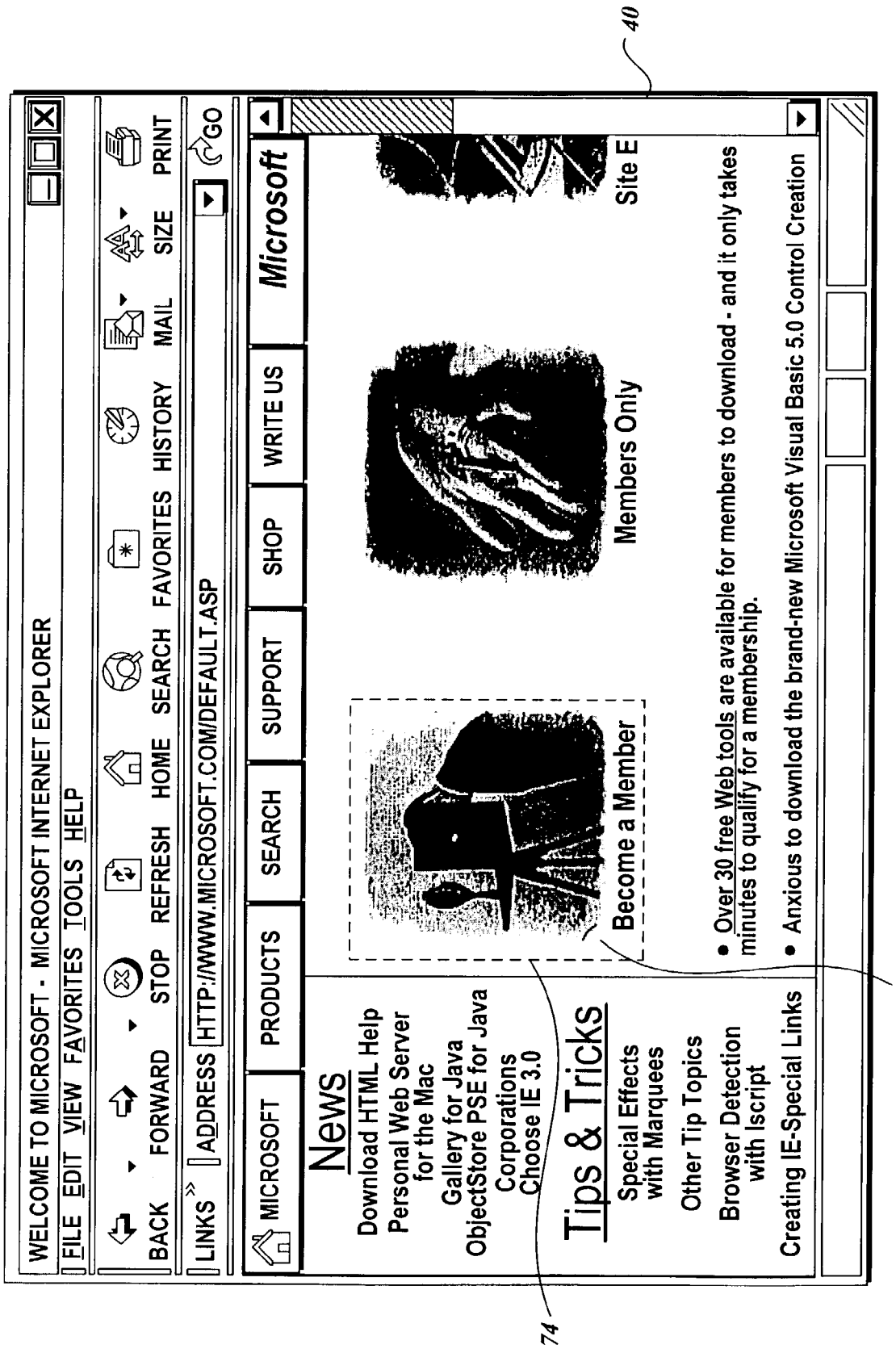
Figure 5C:
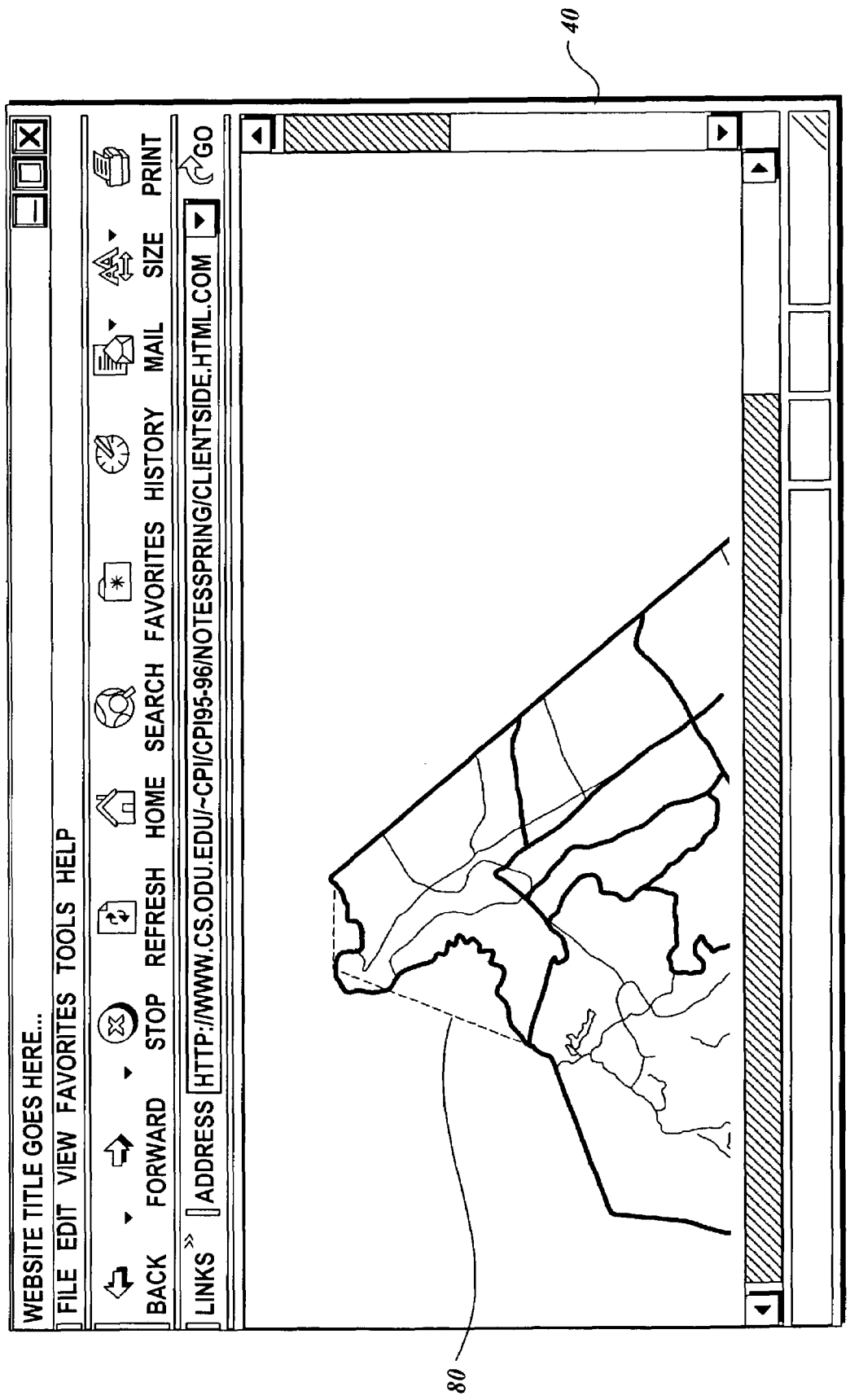

FIGS. 5A-5C show examples of how focus shapes are drawn for different hypertext documents. FIG. 5A shows an example of a circular focus shape 70 that is drawn around a circular hot region 72. FIG. 5B shows an example of a rectangular focus shape 74 that is drawn around a graphical object 60. FIG. 5C shows an example of a polygonal focus shape 80 that is drawn around a hot region of a portion of an image map.

Figure 6A:
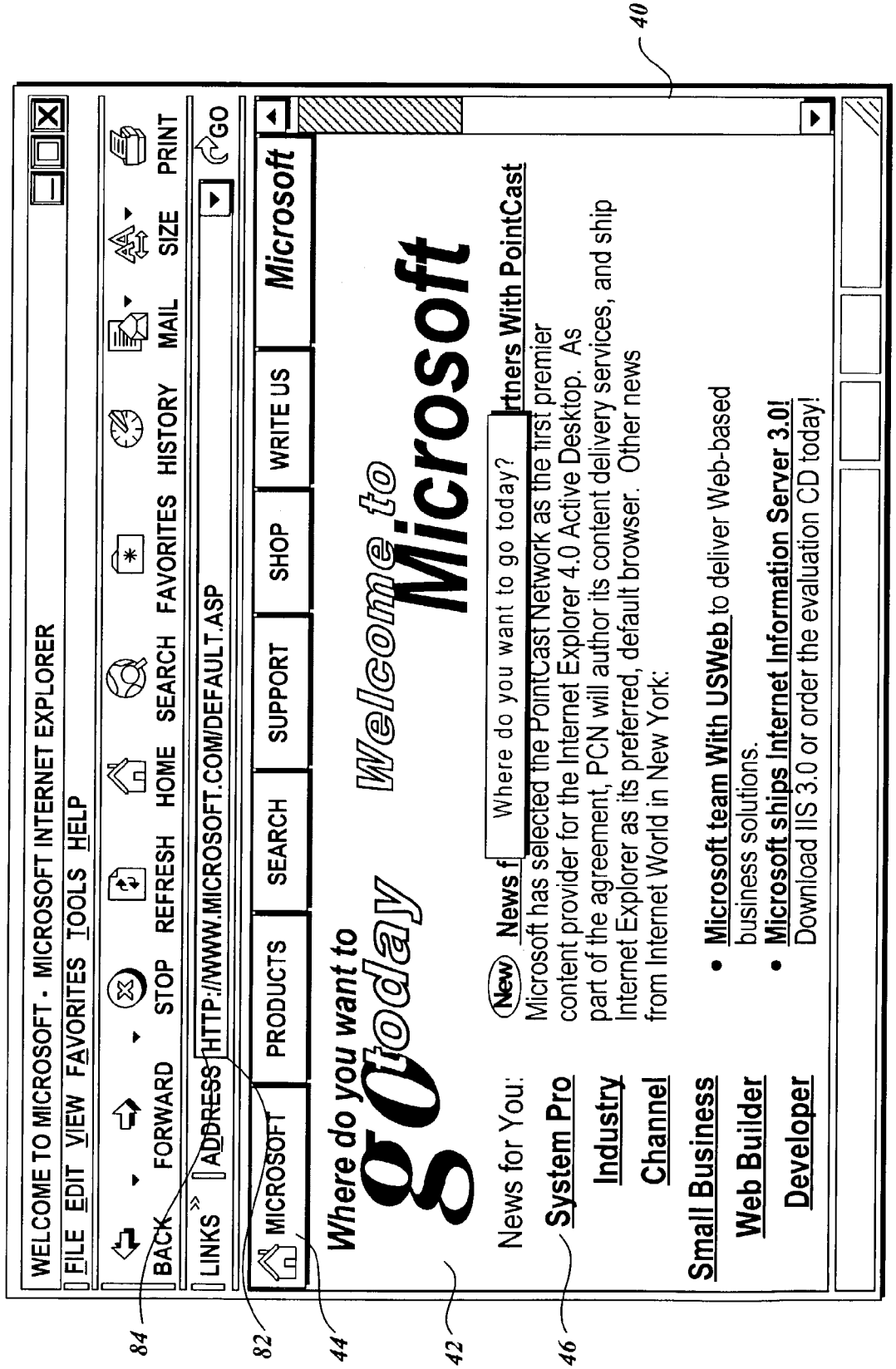
FIGS. 6A-6C show examples of how the appearance of a hypertext document changes when a user presses a tab key a number of times.
Figure 6B:
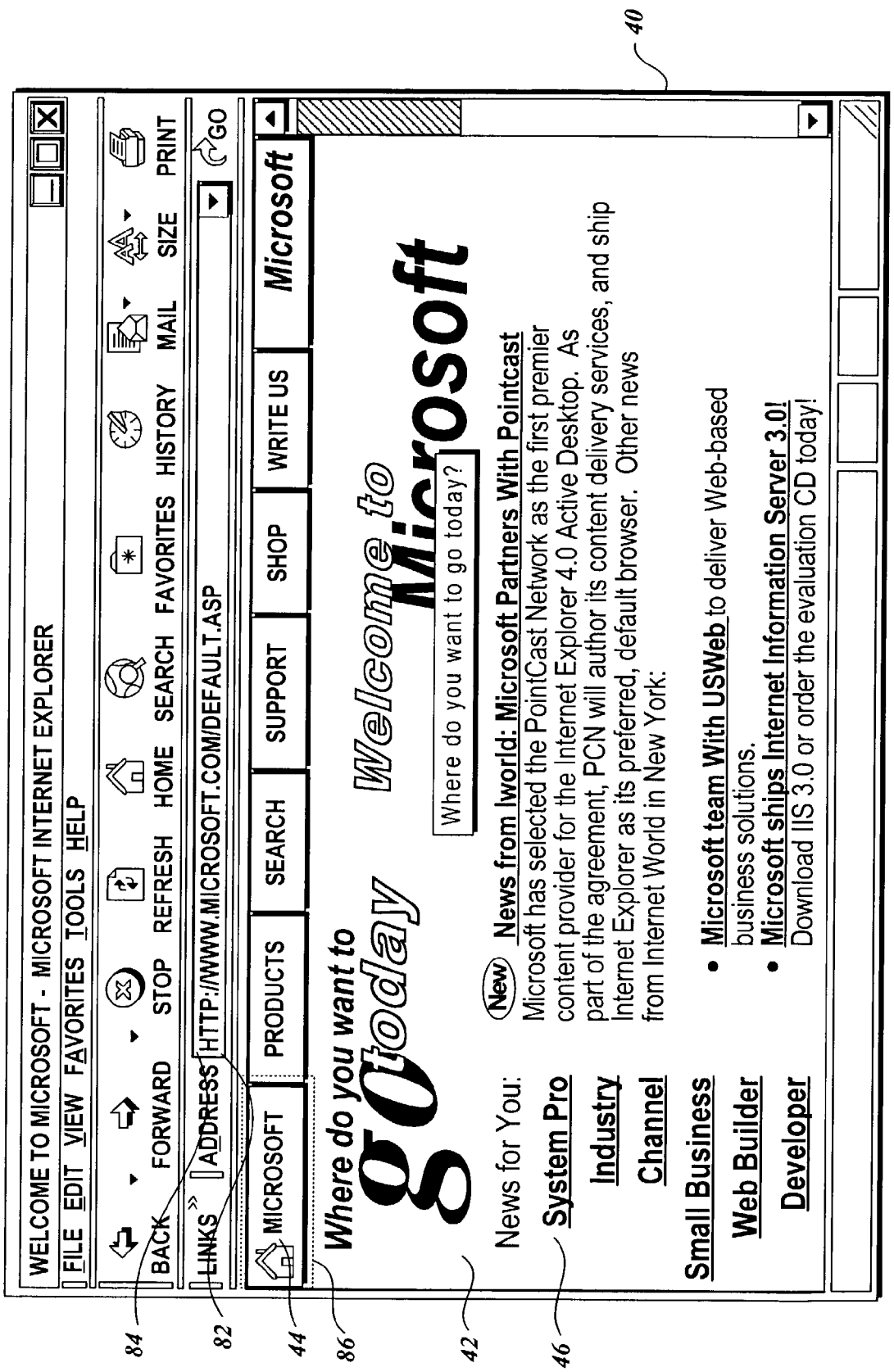
Figure 6C:
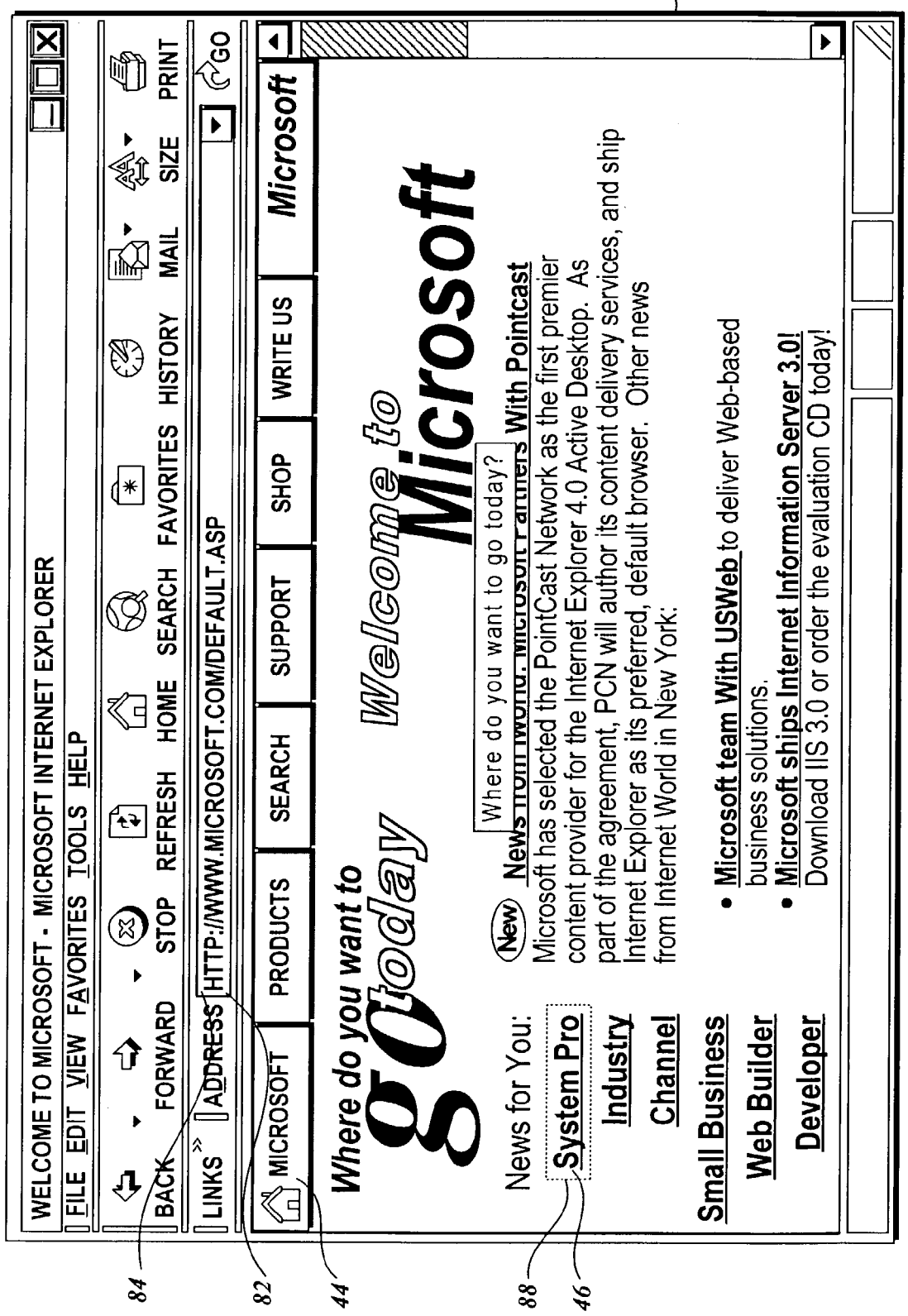

When a user presses the tab key on the keyboard or requests a tab programmatically, the Web browser sequences through the different elements that are displayed on the video display 20 to determine whether the elements warrant a tab stop or not. The elements that warrant a tab stop and that can receive focus are then given focus when tabbed to. The appearance of the element is changed accordingly to reflect having the focus (in most instances). The sequence in which the elements are given focus is defined by what is displayed by the browser and the hypertext document. In general, the elements that will accept the tab stop are certain types of controls and hyperlinks. FIGS. 6A-6C show an example of a portion of a sequence through tab stops when the hypertext document 42 is displayed within the Web browser window 40. The first depression of the tab gives the focus to the address box 82. The text 84 within the address box 82 is highlighted to indicate that it has focus. When a user again depresses the tab button on the keyboard 22, focus is given to the first hyperlink in the sequence of hyperlinks in the hypertext document 42. In the example shown in FIG. 6B, the hyperlink associated with the "Microsoft" button 44 is given focus. A focus rectangle 86 is drawn around the button to indicate that the button has an associated hyperlink and that the hyperlink current has focus. FIG. 6C shows the change in the appearance of the window 40 after the user has pressed the tab button on the keyboard 22 a number of additional times. The focus then changes to the hyperlink associated with text 46. As a result, a focus rectangle 88 is drawn around the text "System Pro." Once a hyperlink has focus, the hyperlink may be activated through the keyboard by performing an action such as hitting the return key.

Figure 7:
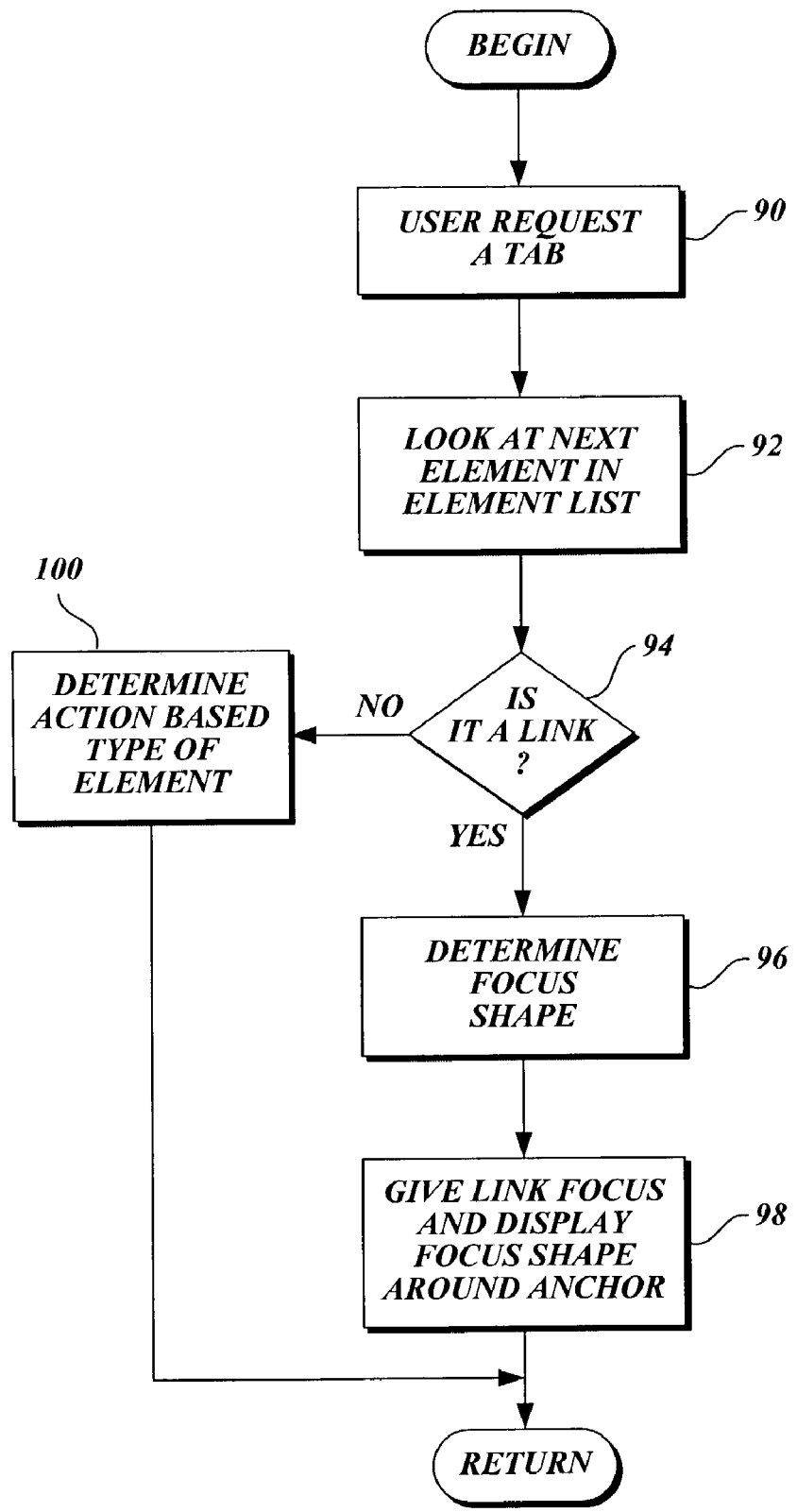
FIG. 7 is a flow chart illustrating the steps that are performed when a user depresses a tab key in accordance with a preferred embodiment of the present invention.

In order to gain a fuller understanding of how the preferred embodiment of the present invention sequences through the hyperlinks, it is helpful to review in more detail the underlying structures and programmatic steps that are performed. FIG. 7 is a flow chart that shows the steps that are performed by the preferred embodiment of the present invention when the user depresses the tab key on keyboard 22. It should be appreciated that it is also possible to programmatically generate a tab. Initially, the user requests a tab by either depressing the tab key on the keyboard 22 or programmatically requesting a tab (step 90 in FIG. 7). In order to appreciate the additional steps that are performed by the preferred embodiment of the present invention, the discussion will first focus on the notion of an element list. The preferred embodiment of the present invention maintains an element list for each of the frames that is displayed on the video display. The term "frame" is used in this context in a fashion consistent with the use of "frame" in Microsoft OLE. In particular, a frame is an object that defines a site in which a view may be displayed. A frame acts like a picture frame in that it establishes boundaries in which a view may be enclosed. The example screen shot shown in FIG. 3A shows a frame for the Web browser and a frame in which the hypertext document is displayed. The Web browser serves as a container in which the hypertext document may be contained.

In step 92 of FIG. 7, in response to the user requesting a tab in step ½0, the next element in the element list is examined. For purposes of simplicity, initially assume that a single frame is displayed on the video display 20.

Figure 8:
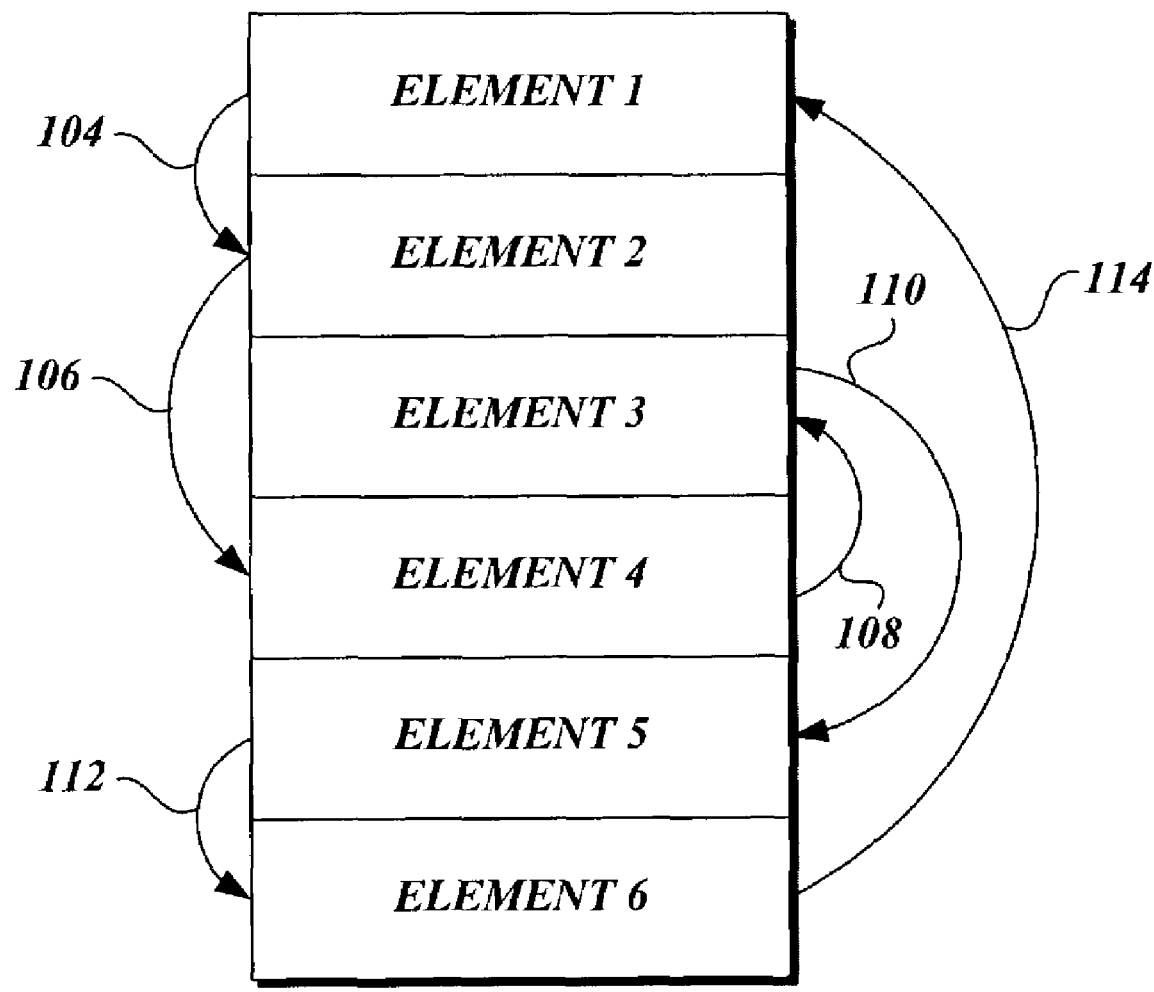
FIG. 8 shows an example of an element list used by the preferred embodiment of the present invention.
Figure 9A:
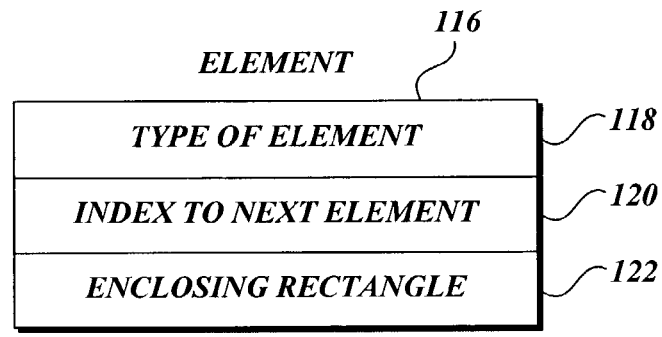
FIGS. 9A and 9B show examples of elements that are part of the element list of FIG. 8.

FIG. 8 shows an example of an element list 102. The element list includes a number of elements that are linked by indices 104, 106, 108, 110, 112, and 114. In a hypertext document, each element within the element list 102 corresponds to an HTML element. FIG. 9A shows the fields that are part of a typical element 116 that are of interest to the preferred embodiment of the present invention. The element includes a field 118 that specifies the type of element. Thus, for hyperlinks, this field 118 specifies that the element is a hyperlink. The element 116 also includes a field 120 that holds an index to the next sequential element within the element list 102. For the example element list 102 shown in FIG. 8, element 1 includes an index 104 that identifies element 2 as the next element, and element 2 includes an index 106 that identifies element 4 as the next sequential element. A field 122 is included within the element 116 to specify the enclosing rectangle for the element. For a typical hyperlink, the enclosing rectangle corresponds to the focus rectangle that is displayed when the hyperlink gains focus.

Figure 9B:
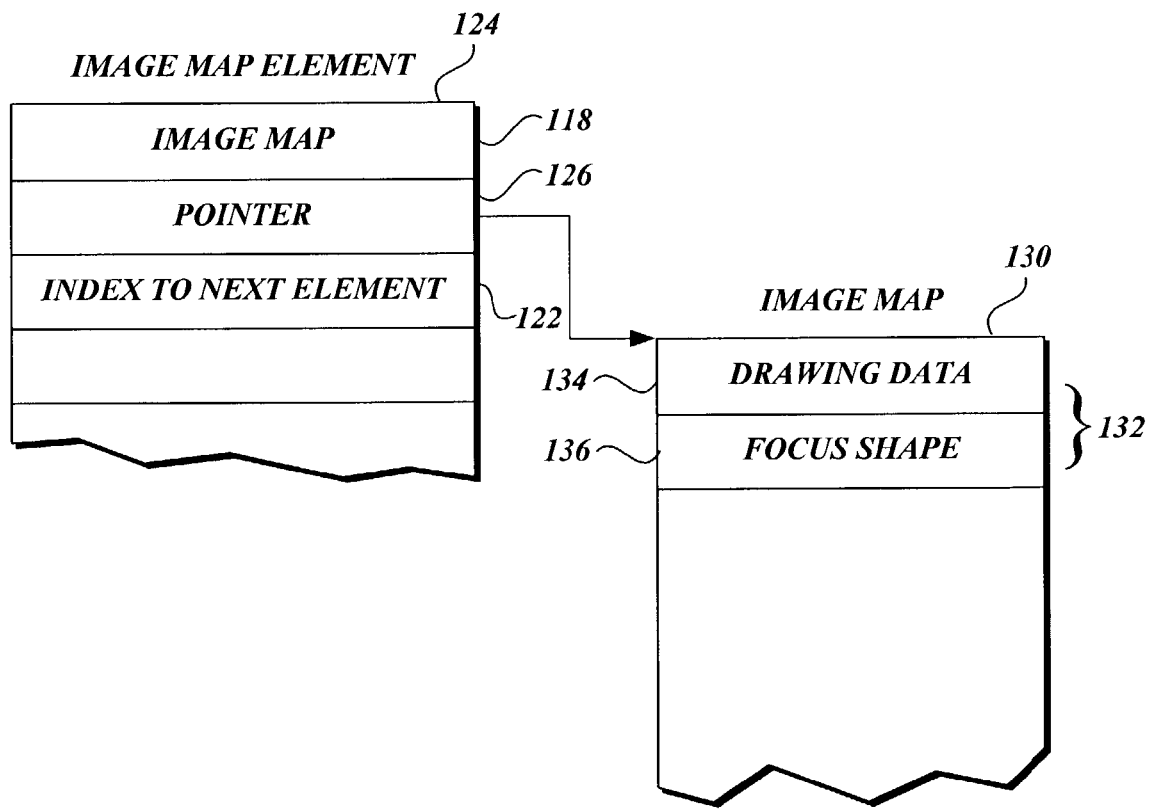

FIG. 9B shows the special case where the element is an image map element 124. Field 118 specifies the element as an image map, and field 122 still holds an index to the next element. However, field 126 holds a pointer to the image map 130. The image map includes components 132 that hold drawing data 134 in a specification of the focus shape for the associated component. Thus, the focus shape may be specified as a circle, rectangle, or polygon, as dictated by HTML. Each component is associated with a respective hyperlink.

Figure 10:
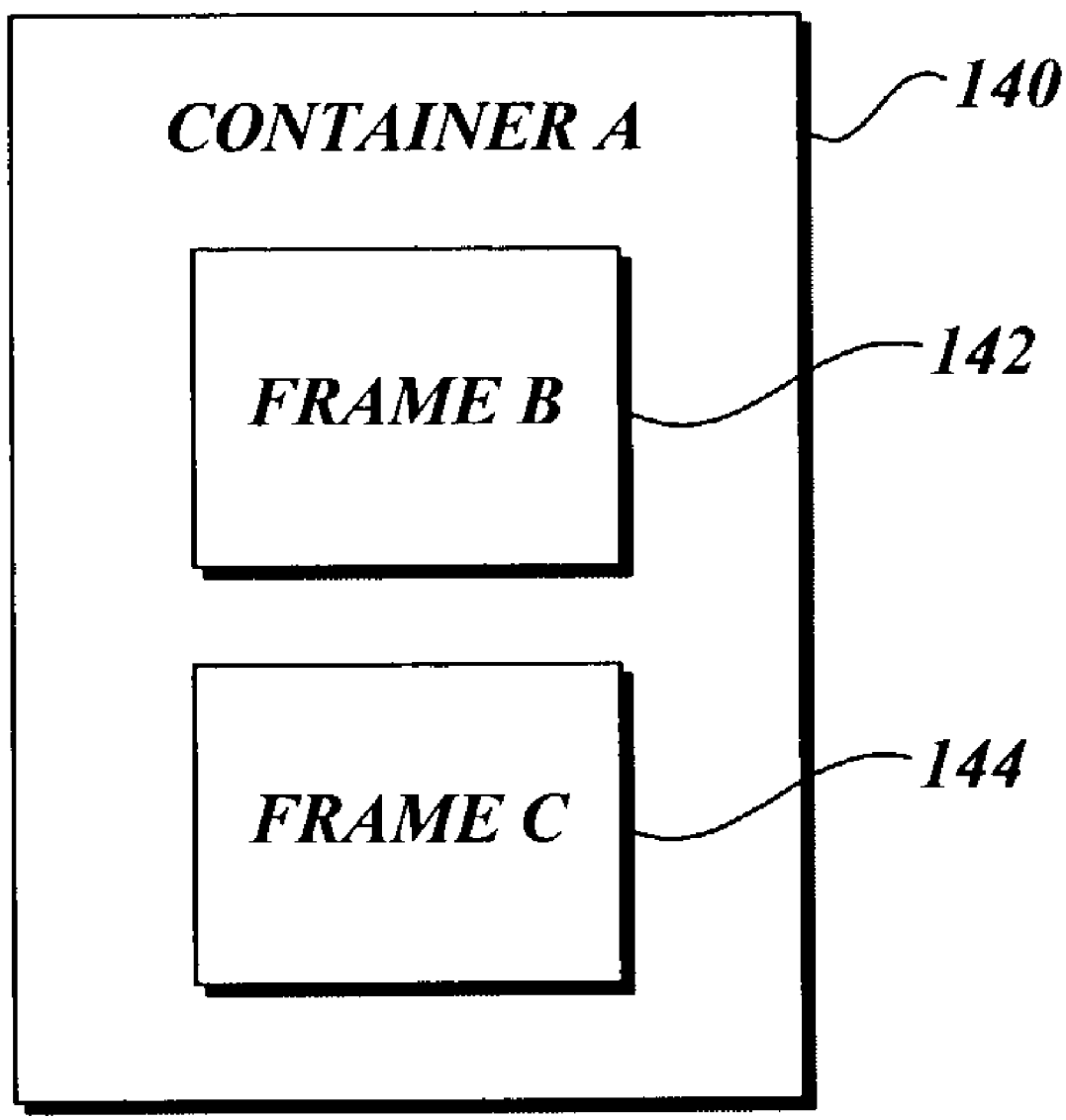
FIG. 10 shows an example of frames that may be displayed on a video display.

An element list 102 is associated with each frame. In grabbing the next element in step 92, the preferred embodiment of the present invention proceeds from the outermost frame into the innermost frame in sequence. FIG. 10 shows an example where there are three frames 140, 142, and 144. In grabbing the next element off the element list, the preferred embodiment of the present invention begins with the elements in the element list for container A. When that element list has been exhausted, elements on the element list for frame 142 are then examined, followed by elements on the element list of frame 144.

After the next element in the element list has been examined in step 92 of FIG. 7, the system examines field 118 to determine the type of element and makes a determination whether the element is a link or not (step 94 in FIG. 7). The system must then determine the appropriate focus shape to draw around the hot region of the hyperlink (step 96 in FIG. 7). As a hyperlink, the system knows that the element may accept the tab stop and must determine whether a focus circle, rectangle, or polygon should be drawn. In most instances, a focus rectangle is drawn. However, if the hyperlink is part of an imaging map, it is possible that a focus circle or polygon should be drawn. In most instances, a focus rectangle is drawn. However, if the hyperlink is part of an image map, it is possible that a focus circle or a polygon may be drawn. Hence, fields 122 or 136 are accessed within the element of the element list to gain information regarding the focus shape in step 92. The associated hyperlink is then given focus, and the focus shape is displayed around the anchor of the hyperlink (step 98 in FIG. 7).

In some instances, the element may not be a hyperlink (as decided in step 94). In such instances, the action that is taken is based upon the type of element (step 100 in FIG. 7). If the element can accept the tab stop and accept focus, it is given focus. One example of such an element is the address box shown in FIG. 6A. The address box can accept the focus and a tab stop. The text within the address box is highlighted to indicate that it has focus. If, on the other hand, the element may not accept the tab stop or may not accept the focus, the system proceeds to the next element to find one that can accept tab stop or focus until such an element is found.

The sequence shown in FIGS. 6A-6C is also helpful in illustrating the sequencing through elements in different element lists where multiple frames are displayed. Two frames are displayed for FIGS. 6A-6C—a frame for the Web browser and a frame for the hypertext document. The element list for the Web browser frame holds an element for the address box, which is a control that can accept the tab stop and the focus. As the container frame is the outermost frame, the preferred embodiment of the present invention begins with the element list for the Web browser frame and grabs the element in the element list for the address box. The address box is given focus. When the tab button is again depressed, there are no more elements on the element list from the Web browser frame that can accept the tab and receive focus; hence, the element list for the hypertext document 42 is accessed. The hyperlink button 44 is the first element that can accept the tab and focus. Accordingly, a focus rectangle is drawn around the element 44. Subsequently, after multiple additional tabs, the hyperlink for text 46 is grabbed as the next element and focus rectangle 88 is drawn around the text.

A user may also proceed backward through the list by pressing the shift key, along with the tab key. In such a case, the sequence is traversed in backward order. The shift and tab may be programmatically initiated. When the shift and tab keys are pressed, the steps that are performed are like those depicted in FIG. 7, but what constitutes the next element differs. The next element is the element that precedes the current element rather than the element that follows the current element.

Figure 11:
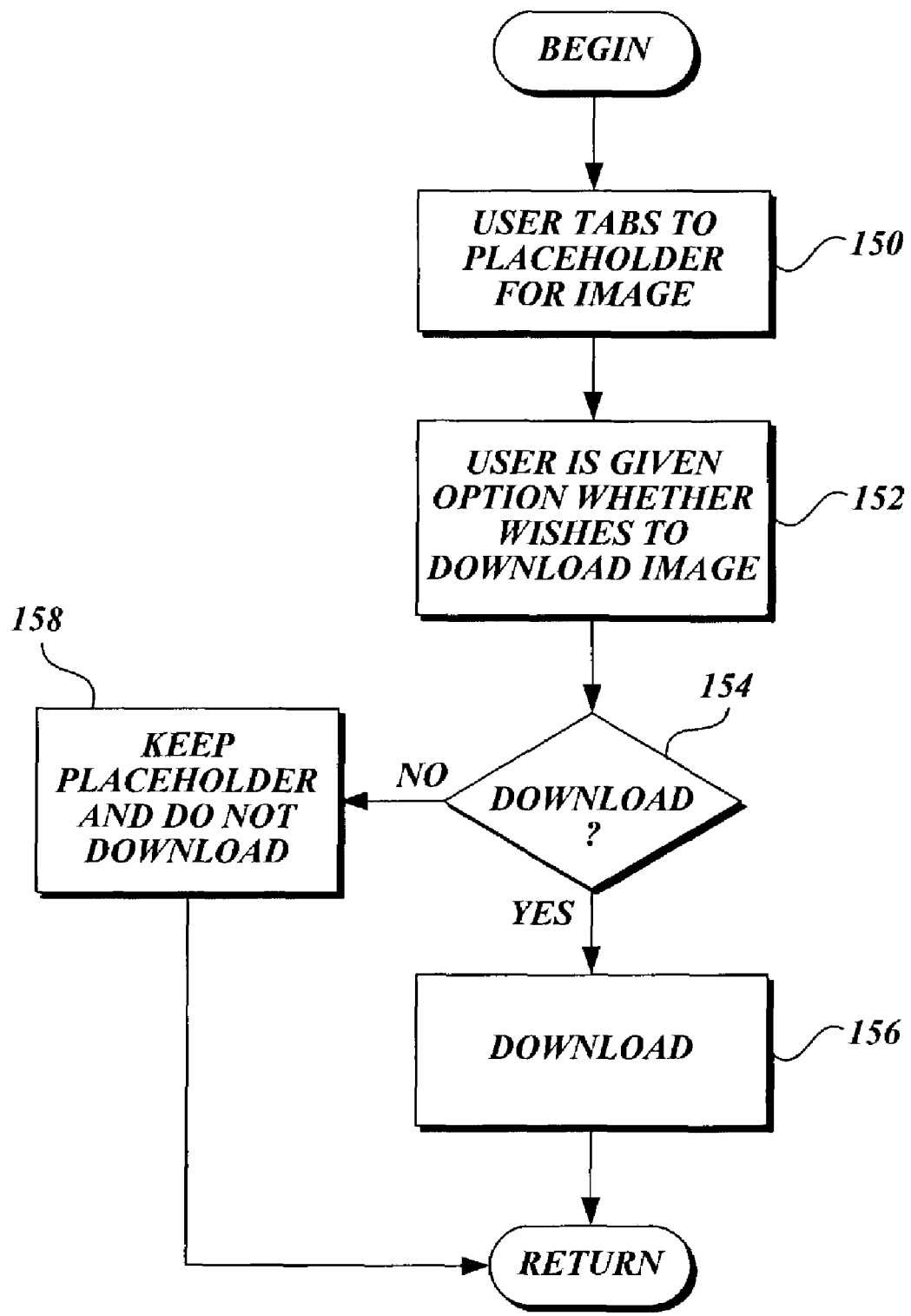
FIG. 11 is a flow chart that illustrates the steps that are performed to determine whether an image in a hypertext document should be downloaded.

In accordance with another aspect of the preferred embodiment of the present invention, a user may selectively decide whether to download images that are part of a hypertext document. When a hypertext document is initially displayed on the video display 20 of the client computer system 10, a placeholder is displayed in place of an image while the data for the image is being downloaded. Since the image appears as an element on the element list that may receive a tab stop and that may have focus, a user may use the tab key to navigate to an image placeholder. FIG. 11 is a flow chart that illustrates the steps that are performed in accordance with a preferred embodiment of the present invention to enable a user to decide whether an image should be downloaded of not. First, the user tabs to the placeholder for the image (step 150 in FIG. 11). The user is then given the option of whether the user wishes to download to the image or not (step 152 in FIG. 11). For example, the Web browser 18 may display a prompt that asks a user whether a user wishes to download the image. If the user wishes to download the image (see step 154 in FIG. 11), the image data is downloaded and is used to replace the placeholder with the actual image in the hypertext document. In contrast, if the user decides to not download the image, the placeholder continues to be displayed and the image data is not downloaded (step 158 in FIG. 11). This feature may be especially helpful when the user does not desire to download.

While the present invention has been described above in reference to a preferred embodiment thereof, those skilled in the art will appreciate that various changes in form and detail may be made without departing from the intended scope of the present invention as defined in the appended claims. For example, the tabbing may work with application programs other than the Web browser.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a computer system having an output device and a document having a plurality of hyperlinks, a method of navigating to a hyperlink in the document, comprising:
   (a) displaying the document on the output device; and
   (b) in response to receiving a tab request, visually identifying the hyperlink in the document without visually identifying any other hyperlinks in the document.

2. The method of claim 1, wherein visually identifying the single hyperlink in the document comprises drawing a focus shape around the visual representation of the hyperlink.

3. The method of claim 2, wherein the focus shape is a rectangle.

4. The method of claim 2, wherein the focus shape is a circle.

5. The method of claim 2, wherein the focus shape is a polygon.

6. The method of claim 1, further comprising:
   (a) receiving another tab request; and
   (b) in response to receiving the other another tab request, sequentially visually identifying giving focus to another hyperlink in the document without visually identifying any other hyperlinks in the document, wherein the other hyperlink is the next hyperlink in the document.

7. The method of claim 1, wherein the computer system includes a keyboard with a tab key and wherein the tab request is generated by actuating the tab key on the keyboard.

8. In a computer system having a video display and a hypertext document having a plurality of hyperlinks, a method comprising:
   (a) displaying a visual identification of a hyperlink in the hypertext document on the video display without providing any visual identification of other hyperlinks in the document;
   (b) in response to a tab command, sequentially determining a next hyperlink in the document;
   (c) displaying a visual identification of the next hyperlink without providing any visual identification of other hyperlinks in the document; and (d) drawing a non-rectangular focus shape around the next hyperlink to indicate when the next hyperlink is given focus without drawing a non-rectangular focus shape around other hyperlinks in the document.

9. The method of claim 8, wherein the non-rectangular focus shape is circular.

10. The method of claim 8, wherein the non-rectangular focus shape is polygonal.

11. The method of claim 8, wherein the hyperlink is part of an image map.

12. In a distributed system having a server and a client, wherein the client includes a display device and a keyboard device having at least one key, a method comprising:
   (a) providing an image map at the client from the server wherein the image map includes a plurality of hyperlinks, each hyperlink being associated with a particular portion of the image map;
   (b) displaying the image map on the display device;
   (c) in response to actuating a selected key of the keyboard device, sequentially determining a next hyperlink associated with a particular portion of the image map, wherein the determination of the next hyperlink is executed on the client; and
   (d) displaying a visual indication of the presence of the next hyperlink in the image map without providing any visual indication of the presence of other hyperlinks in the image map.

13. The method of claim 12, wherein the method further comprises sequentially providing a visual indication of the presence of another of the plurality of hyperlinks without providing a visual indication of the presence of other hyperlinks in the image map in response to another actuation of the selected key of the keyboard device.

14. The method of claim 12, wherein the visual indication is a focus shape.

15. The method of claim 14, wherein the focus shape is rectangular.

16. The method of claim 14, wherein the focus shape is circular.

17. The method of claim 14, wherein the focus shape is non-rectangular and polygonal.

18. The method of claim 14, wherein a given hyperlink has an associated hot region and wherein the focus shape is drawn around the hot region.

19. The method of claim 12, wherein the selected key is a tab key.

20. The method of claim 12, wherein the method further comprises providing a visual indication of the next hyperlink in response to actuating the selected key of the keyboard device without providing any visual indication of other hyperlinks in the image map.

21. In a computer system having an output device and a document having at least one hyperlink, a computer-readable medium holding computer executable instructions for performing a method of navigating to a hyperlink, comprising:
   (a) displaying the document on the output device; and
   (b) in response to receiving a tab request, sequentially providing a visual indication of the hyperlink in the document without providing any visual indication of other hyperlinks in the document.

22. The computer-readable medium of claim 21, wherein the hyperlink has a visual representation in the document and wherein providing the visual indication comprises drawing a focus shape around the visual representation of the hyperlink.

23. The computer-readable medium of claim 22, wherein the focus shape is a rectangle.

24. The computer-readable medium of claim 22, wherein the focus shape is a circle.

25. The computer-readable medium of claim 22, wherein the focus shape is a polygon.

26. The computer-readable medium of claim 21, wherein the method further comprises:
   (a) receiving another tab request; and
   (b) in response to receiving the other another tab request, sequentially providing a visual indication of giving focus to another hyperlink in the document without providing any visual indication of other hyperlinks in the document.

27. In a computer system having a display and a hypertext document having a plurality of hyperlinks, a computer-readable medium holding computer-executable instructions for performing a method comprising:
   (a) displaying a visual indication of a hyperlink in the hypertext document on the display without providing any visual indication of other hyperlinks in the document;
   (b) in response to a tab command, sequentially determining a next hyperlink in the document, wherein the determination of the next hyperlink is based on an element list comprising information describing a type of the next hyperlink and the relative location of the next hyperlink;
   (c) displaying a visual indication of the next hyperlink without providing any visual indication of other hyperlinks in the document; and
   (d) drawing a non-rectangular focus shape around the next hyperlink to indicate that the next hyperlink is given focus without drawing a non-rectangular focus shape around other hyperlinks in the document.

28. The computer-readable medium of claim 27, wherein the hyperlink is part of an image map.

29. In a distributed system having a server and a client, wherein the client includes a display device and a keyboard device having at least one key, a computer-readable medium holding computer-executable instructions for performing a method comprising:
   (a) providing an image map at the client from the server wherein the image map includes a plurality of hyperlinks, each hyperlink is associated with a particular portion of the image map;
   (b) displaying the image map on the display device;
   (c) in response to actuating a selected key of the keyboard device, sequentially determining a next hyperlink associated with a particular portion of the image map, wherein the determination of the next hyperlink is executed on the client; and
   (d) displaying a visual indication of the presence of the next hyperlink in the image map without providing any visual indication of the presence of other hyperlinks in the image map.

30. The computer-readable medium of claim 29, wherein the method further comprises sequentially providing a visual indication of the presence of another of the hyperlinks without providing a visual indication of the presence of other hyperlinks in the image map in response to another actuation of the selected key of the keyboard device.

31. The computer-readable medium of claim 29, wherein the visual indication is a focus shape.

32. The computer-readable medium of claim 31, wherein a given hyperlink has an associated hot region and wherein the focus shape is drawn around the hot region.

* * * * *